US005941809A

United States Patent [19]

Sainz et al.

[11] Patent Number: 5,941,809

[45] Date of Patent: Aug. 24, 1999

[54] METHOD OF PRODUCING A PROTECTIVE DEVICE FOR USE WITH CONTAINERS HAVING HANDHOLD OPENINGS

[75] Inventors: Raymond R. Sainz, 3224 Bryant St., Denver, Colo. 80211; Joseph S. Sainz, Denver; Lynn J. McCarthy, Littleton, both of Colo.

[73] Assignees: Frederick M. Wise; Raymond R. Sainz, both of Denver, Colo.

[21] Appl. No.: 09/144,896

[22] Filed: Sep. 1, 1998

Related U.S. Application Data

[60] Division of application No. 08/751,003, Nov. 15, 1996, Pat. No. 5,803,347, which is a continuation-in-part of application No. 08/494,930, Jun. 26, 1995, Pat. No. 5,727,728.

[51] Int. Cl.[6] .............................. B31B 1/25; B32B 31/06

[52] U.S. Cl. .............................. 493/59; 493/74; 156/522; 156/519

[58] Field of Search .............................. 493/59, 75, 76, 493/78, 86, 88, 130, 131, 73, 74; 156/509, 522, 519, 257, 258, 183

[56] References Cited

U.S. PATENT DOCUMENTS

| | | | |
|---|---|---|---|
| 444,821 | 1/1891 | Feister | 156/522 |
| 1,762,703 | 6/1930 | Smith | 493/59 |
| 1,960,800 | 5/1934 | Stokes | 493/59 |
| 2,015,202 | 9/1935 | Stokes | 493/59 |
| 2,016,462 | 10/1935 | Stokes | 493/59 |
| 2,382,573 | 8/1945 | Moore | 493/59 |
| 2,760,715 | 8/1956 | Sicking . | |
| 2,820,733 | 1/1958 | Sorel . | |
| 3,345,921 | 10/1967 | Foss | 493/59 |
| 3,398,439 | 8/1968 | Fried et al. . | |
| 3,547,337 | 12/1970 | Pisarczuk . | |
| 3,687,754 | 8/1972 | Stumpf | 156/519 |
| 3,725,188 | 4/1973 | Kalt . | |
| 3,788,538 | 1/1974 | Kuenzi . | |
| 4,359,183 | 11/1982 | Aida et al. . | |
| 4,545,780 | 10/1985 | Martin | 493/74 |
| 4,550,048 | 10/1985 | Nakagawa . | |
| 4,711,237 | 12/1987 | Kaiser . | |
| 4,882,004 | 11/1989 | Watson | 493/522 |
| 5,074,461 | 12/1991 | Parker et al. . | |
| 5,413,665 | 5/1995 | Gaetano | 156/519 |
| 5,651,851 | 7/1997 | Gatcomb | 493/59 |
| 5,674,334 | 10/1997 | Instance | 156/519 |
| 5,709,771 | 1/1998 | Fritzman | 493/410 |
| 5,727,728 | 3/1998 | Sainz et al. . | |
| 5,803,347 | 9/1998 | Sainz . | |

FOREIGN PATENT DOCUMENTS

| | | |
|---|---|---|
| 0 394 730 A1 | 10/1990 | European Pat. Off. . |
| 2 610 596 | 8/1988 | France . |
| 93/02930 | 2/1993 | WIPO . |

*Primary Examiner*—Stephen F. Gerrity
*Assistant Examiner*—Eric J. Weierstall
*Attorney, Agent, or Firm*—Timothy J. Martin; Michael R. Henson

[57] ABSTRACT

The present invention provides a method of producing a protective device that is adapted for use with a container in order to inhibit ingress of unwanted materials through a handhold opening in a wall of the container. The method includes a first step of advancing a first strip of material in a longitudinal direction from an upstream location to a downstream location. As this first strip of material is advanced, it is longitudinally scored after which a second strip of material is secured to the first strip of material such that the second strip is sealed around a discrete consecutive portion of the scoring. Thereafter, an adhesive material is applied to a side surface of the first strip opposite the second strip. The joined first and second strips are then cut into individual units with portions of the first and second strips in each unit being sealed completely around the periphery thereof. The method can include further steps of applying a deadening material to the adhesive material on the side surface of the first strip opposite the second strip. Moreover, the step of scoring the first strip may be accomplished by continuously scoring the first strip as it is advanced in the downstream direction. This step of scoring may also be accomplished by scoring the first strip with a plurality of parallel, spaced-apart longitudinally extending score lines. The step of securing the second strip to the first strip may be accomplished by fusing the first and second strips together.

5 Claims, 4 Drawing Sheets

METHOD OF PRODUCING A PROTECTIVE DEVICE FOR USE WITH CONTAINERS HAVING HANDHOLD OPENINGS

RELATED APPLICATION

The present application is a division of a application Ser. No. 08/751,003, now U.S. Pat. No. 5,803,347 filed on Nov. 15, 1996, which is a continuation-in-part of Ser. No. 08/494, 930 entitled Protective Device For Use With Containers Having Handhold Openings filed Jun. 26, 1995 now U.S. Pat. No. 5,727,728.

FIELD OF THE INVENTION

The present invention broadly concerns the packaging of objects in containers so as to inhibit contact with the object by dust and other contaminant particles in the environment. More particularly, the present invention concerns the packaging of objects in boxes which have handhold openings formed through a wall thereof so that a user may manually grasp the box by inserting the hands through the handhold openings. The present application is specifically directed to a method of producing structures which may mount over the handhold openings to prevent ingress of contaminants.

BACKGROUND OF THE INVENTION

The use of various containers, such as boxes, for the packaging of objects for storage and/or shipment is well-known. A large portion of these containers are in varied forms of corrugated paper boxes which provide a relatively inexpensive and disposable means for packaging the objects. Often, such cardboard boxes and other containers are provided with a pair of oppositely disposed handhold openings formed in the sidewall thereof which facilitate lifting and carrying the boxed object. In cardboard boxes, these handhold openings are typically die-cut through the sidewall of the box and may be either a simple opening or, alternatively, may be a hinged opening.

The presence of the handhold openings, where they communicate with the interior of the container, correspondingly reduce the effectiveness of the container's exclusion of contaminant materials from entering the interior. Accordingly, since the interior is not sealed, dust and other contaminants may migrate from the external environment to the interior of the container. Accordingly, while handhold openings provide a highly useful convenience, they are not without their drawbacks.

The ingress of dust and other contaminants into the interior of a container that houses an object is an increasing problem where the objects so packaged are delicate electronic equipment especially because of the electrostatic charges which may be on the equipment. The electrostatic charge can attract charged dust particles and other particulate contaminants. The need to isolate such electronic equipment is prevalent in the computer industry, but the intrusion of dust and other contaminants is a problem in the packaging and shipment of stereo equipment, medical equipment and even bicycles, to name a few products. Because of this, it is often the practice to "bag" the product in a sealed plastic wrapping and place the wrapped package in the container. This naturally adds increased costs in the form of materials and labor; it also increases the amount of discarded materials when the object is removed from the container. Thus, the bagging of objects for further packaging in a container is both a costly and a non-ecologically sound practice. Nonetheless, it has heretofore been necessary in order to protect the packaged object.

In our U.S. Pat. No. 5,727,728, we provide a protective device adapted to be used with a container as well as a container including such a protective device. Our protective device described in this prior patent includes a panel piece that has a surrounding peripheral edge, with the panel piece being sized and configured to have a size greater than the size of the handhold opening so that the margin portion is securable to the wall of the container with the panel piece in the secured state over the handhold opening. A first adhesive material is disposed on the first margin portion of the panel piece and is operative to secure the panel piece in the secured state and to seal the margin portion in an area surrounding the handhold opening. A bi-fold structure is also described in order to create a chamber that receives the hand of the user with the chamber being isolated from the interior of the container when the protective device is secured over the handhold opening on the interior of the container. The panel piece includes a portal that may be provided in the bi-fold structure with this portal being positioned over the handhold opening so that the hand may be inserted through the handhold opening and through the portal. This portal may be an opening, but it is also shown as a scored portion that defines a tear-away section.

Despite the improvements afforded by our earlier invention, there remains a need for better protective devices which can be used in conjunction with a container for packaging an object in order to inhibit contact of the object with contaminant, airborne particles. There is a further need for a combination container and protective device which can house an object in an efficient manner so as to reduce the likelihood of contamination of the object during storage and shipment. A need exists, therefore, for a simplified device which can be used with containers, such as cardboard boxes, in order to isolate the interior of the box from the outside environment where the box is provided with handhold openings.

SUMMARY OF THE INVENTION

It is an object of the present invention to provide a method of manufacturing a protective device that can be mounted on the interior of a container to protect the interior against intrusion by contaminant particles.

The present invention is broadly directed to the method of producing a protective device as described in our co-pending application, Ser. No. 08/751,003, now U.S. Pat. No. 5,803, 347. Such protective device is adapted to be used with a container when packaging an object. The typical container has an interior and a wall that is provided with a handhold opening of a selected size and configuration. The protective device is operative to inhibit ingress of unwanted materials into the interior through the handhold opening while permitting insertion of a hand for grasping the handhold opening.

Broadly, the protective device includes a mounting panel that is sized and configured to have a mounting panel size greater than the selected size and configuration of the handhold opening. The mounting panel has a portal formed therein, and a first adhesive material is located on a first side surface of the mounting panel. This first adhesive material is operative to secure the mounting panel in a secured state to the wall of the container in the interior thereof so that the portal is positioned over the handhold opening. In this manner, the first adhesive material forms a continuous, uninterrupted seal around the handhold opening when the protective device is in the secured state thereby to seal the mounting panel to the wall in a surrounding relation to the handhold opening. A deadening material is disposed on a selected area of the first adhesive material thereby to inhibit adherence of the mounting panel to a portion of the wall which confronts the deadening material thereby to provide a region of said mounting panel that is unsecured to the wall at a location alongside the handhold opening. An exclusion panel is sized and configured to have a panel size greater than the selected size and configuration of the handhold opening. The exclusion panel is located on a second side of the mounting panel opposite the adhesive material, and the exclusion panel has a surrounding outer peripheral margin portion that is secured to the mounting panel thereby to position and secure exclusion panel in a position over the handhold opening.

The deadening material may be a non-adhesive material which is affixed to the mounting panel. One example is paper material that is secured to the adhesive layer. Alternatively, the deadening material may be a chemical compound. A peel-away backing panel may also be secured to the mounting panel in a releasable manner so that it protects the adhesive layer prior to use.

The mounting panel may be constructed of a paper material and the exclusion panel may be constructed of a plastic material. In any event, their margin portions may be secured in any convenient manner, such as by an adhesive or by a mechanical fusing process. The portal may be an opening, but is preferably formed by a scored portion of the mounting panel that defines a tear-away section. Here, the scored portion includes a plurality of parallel first scorelines and may include a plurality of parallel second scorelines with the second scorelines extending transversely of the first scorelines. The scored portion may extend completely from edge of the mounting panel to an opposite edge of the mounting panel. Here, also, the deadening material may be disposed parallel to the scored portion in a close-spaced apart parallel relation thereto. Here, the protective device may be rectangular in shape, but, in any event, the mounting panel and the exclusion panel should be geometrically congruent for simplicity. Where the protective device is rectangular, it is preferred that the scoring lines extend longitudinally thereof.

That invention also contemplated a container which has a bottom wall, a top wall, and a surrounding sidewall operative to enclose an interior with the surrounding sidewall having at least one but preferably two handhold openings formed therethrough. This container then includes a protective device mounted over each handhold opening. The protective devices may be constructed as described above.

Accordingly, the present invention describes and claims a method of producing such a protective device. Here, the method includes a first step of advancing a first strip of material in a longitudinal direction from an upstream location to a downstream location. As this first strip of material is advanced, it is longitudinally scored after which a second strip of material is secured to the first strip of material such that the second strip is sealed around a discrete consecutive portion of scoring. Thereafter, an adhesive material is applied to a side surface of the first strip opposite the second strip. The joined first and second strips are then cut into individual units with portions of the first and second strips in each unit being sealed completely around the periphery thereof.

The method can include further steps of applying a deadening material to the adhesive material on the side surface of the first strip opposite the second strip. Moreover, the step of scoring the first strip may be accomplished by continuously scoring the first strip as it is advanced in the downstream direction. This step of scoring may also be accomplished by scoring the first strip with a plurality of parallel, spacedapart longitudinally extending scorelines. The step of securing the second strip to the first strip may be accomplished by fusing the first and second strips together.

These and other objects of the present invention will become more readily appreciated and understood from a consideration of the following detailed description of the exemplary embodiments when taken together with the accompanying drawings, in which:

BRIEF DESCRIPTION OF THE DRAWINGS

FIG. 2(*b*) is a diagrammatic cross-sectional view of the prior art container having a hinged handhold opening;

DETAILED DESCRIPTION OF THE EXEMPLARY EMBODIMENTS

The present invention is directed to a method for producing a protective device that is adapted to be used with a container when packaging an object in order to inhibit ingress of unwanted materials into the interior of the container through handhold openings formed in a wall thereof. In order to appreciate the method, a description of the protective device is first provided.

Figure 1:
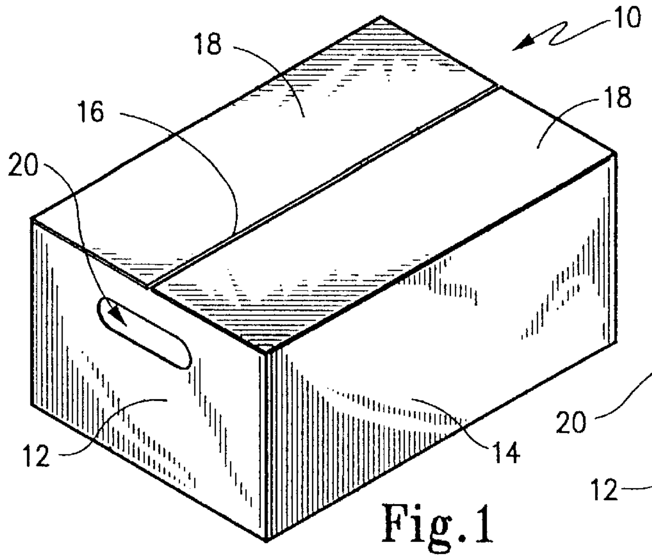
Fig.1 (PRIOR ART)
FIG. 1 is a perspective view of a representative prior art container used in the packaging of objects.

As is shown in FIG. 1, a prior art container 10 is depicted as a corrugated paper box having a surrounding wall including a bottom wall (not shown), a pair of end walls, such as end wall 12, and a pair of sidewalls, such as sidewall 14. A top wall is formed by flaps 16 and 18 which may be folded over one another and sealed until the box is opened. End walls 12 are each provided with a handhold opening 20 of a selected size and configured to allow the human hand to be inserted for grasping the handhold opening during the lifting of container 10.

Figure 2A:
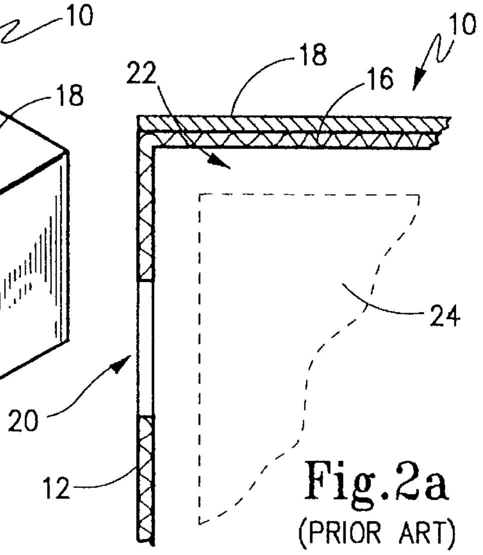
Fig.2a (PRIOR ART)
FIG. 2(*a*) is a diagrammatic view of a cross-section of the wall of the prior art container shown in FIG. 1 provided with a handhold opening.
Figure 2B:
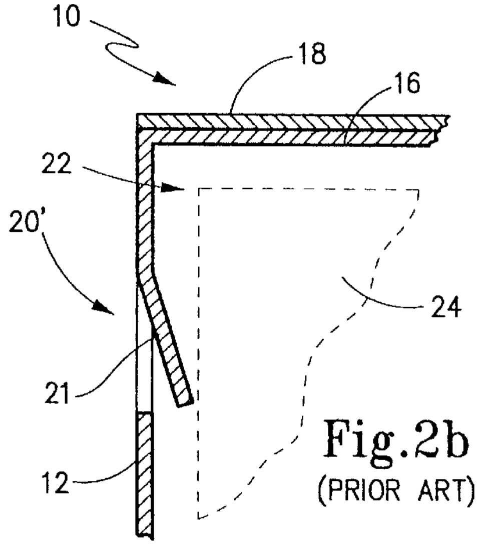
Fig.2b (PRIOR ART)

With reference first to FIG. 2(*a*), it may be seen that handhold opening 20 is simply a cut out portion which exposes the interior 22 of container 10 to the external environment. As is shown in this figure, in phantom, an object 24 placed in the interior 22 may thus be exposed to dust and other particulate contaminants which may enter interior 22 through handhold opening 20. In FIG. 2(*a*), it should also be appreciated that in the regions between object 24 and the various walls of container 10 may be filled with packaging material such as foam, bubble wrap, etc., to cushion the object during shipment. In FIG. 2(*b*), an alternative handhold opening 20' is shown for container 10 that houses object 24. Here, handhold opening 20' is provided by a cut-out which only extends on three sides of opening 20' thereby leaving a flap 21 hingedly attached to end wall 12. It should be understood that the present invention may be used with either of the type of handhold openings 20, 20'.

As is shown, then, in FIGS. 3–7, a protective device 30 according to a first exemplary embodiment includes a mounting panel 32 which is sized and configured to have a mounting panel size that is greater than the selected size and configuration of the handhold opening 20'. As described more thoroughly below, mounting panel 32 has a portal 50 formed therein. Mounting panel 32 may be formed of any suitable flexible material, such as paper and plastic, and has an adhesive layer 34 formed of a suitable adhesive material of a type that will allow mounting panel 32 to be secured to wall 12 in a secured state in the interior of container 10 with portal 50 positioned over the handhold opening such as handhold opening 20'. Preferably, the adhesive layer 34 extends completely over the first side surface of mounting panel 32. Thus, adhesive layer 34 forms a continuous, uninterrupted seal around handhold opening 20' when in the secured state thereby to seal the mounting panel 32 to wall 12 in a surrounding relation to the handhold opening.

An exclusion panel 36 is also sized and configured to have a panel size greater than the selected size and configuration of the handhold opening and is preferably geometrically congruent with mounting panel 32. The exclusion panel 36 is located on a second side of mounting panel 32 opposite adhesive layer 34 and has an outer peripheral margin portion 38 secured to mounting panel 32 in order to position and secure exclusion panel 36 in position over the handhold opening 20' when the protective device is in the mounted state. Outer peripheral margin 38 may be affixed to the outer peripheral margin of mounting panel 32 in any convenient manner. Preferably, exclusion panel 36 is formed of a plastic material which may be fused directly to the periphery of mounting panel 32 or attached by an adhesive, such as an ultraviolet activated adhesive. This fused region 40 is shown, for example, in FIG. 6.

Figure 3:
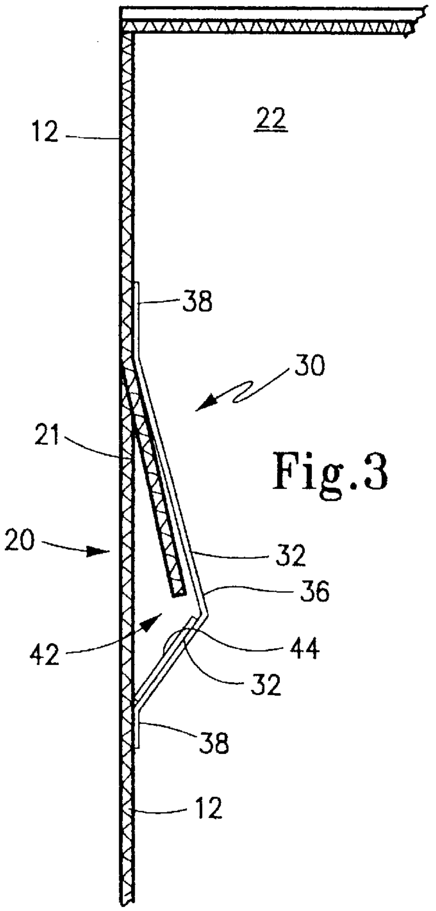
FIG. 3 is a cross-sectional view of a sidewall of a container having the protective device of the a first exemplary embodiment of the protective device according to the present invention secured thereto in a masking relation to a representative handhold opening.

As is shown in FIG. 3, protective device 30 is secured across handhold opening by the adhesive layer 34. To this end, mounting panel 32 is secured not only to the sidewall 12 but also is secured to flap 21 that forms the cut-out of handhold opening 20'. In order to provide a release region so that a chamber 42 is created when a user inserts his/her hand through handhold opening 20', protective device 30 is provided with a deadening material 44 that is disposed on a selected area of the adhesive layer 34 to inhibit adherence of mounting panel 32 to the wall 12 confronting the deadening material 44. This provides a region of mounting panel 32 that is unsecured to wall 12 at a location alongside the handhold opening 20'.

Figure 4:
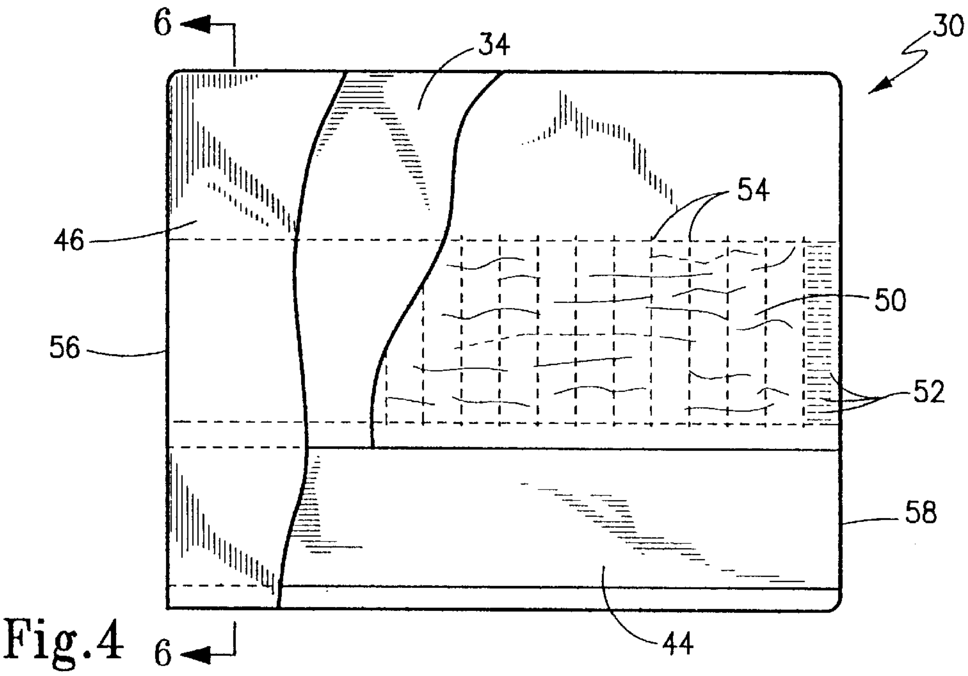
FIG. 4 is a front view in a elevation of the protective device shown in FIG. 3 prior to attachment.

As is shown in FIGS. 3 and 4, deadening material 44 is preferably in the form of a longitudinally extending strip of non-adhesive material, such as paper, that is directly adhered to adhesive layer 34. Alternatively, a chemical deadening agent may be used that will either coat the adhesive material or deactivate the adhesive material in the deadened region.

Prior to the attachment of protective device 30 to container 10, it is desirable to protect the adhesive layer 34. To this end, a peel-away backing panel 46 may be secured to adhesive layer 34. Prior to use, backing panel 46 is removed so that protective device 30 may be secured over handhold opening 20' in the interior 22 of container 10.

Figure 7:
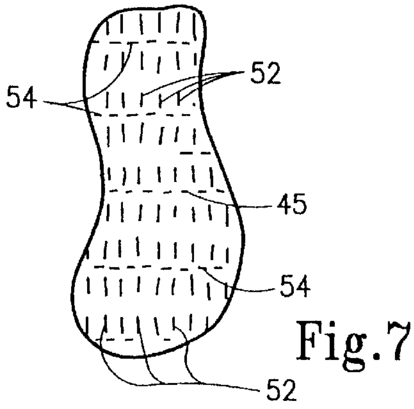
FIG. 7 is an enlarged front view in elevation showing a portion of the scored area for the protective device according to the embodiments shown in FIGS. 3–6 and 7–8.
Figure 5:
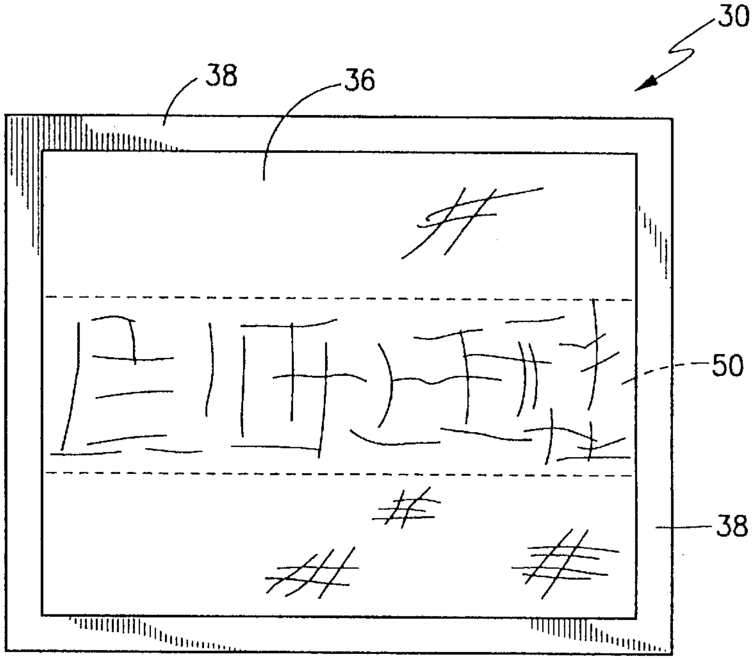
FIG. 5 is a back view in elevation showing the protective device of FIG. 4.
Figure 6:
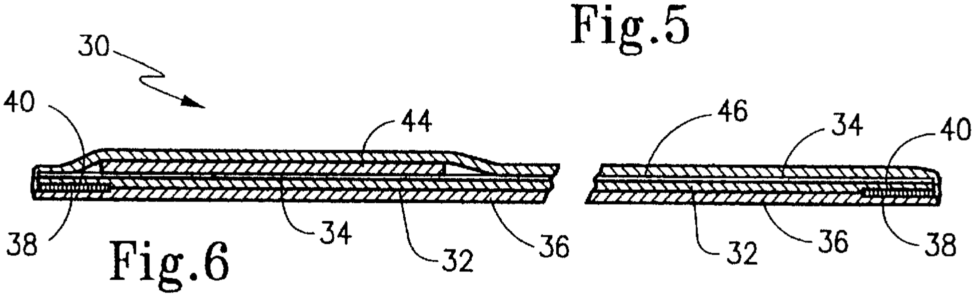
FIG. 6 is a cross-sectional view taken about lines 6—6 of FIG. 4.

With reference now to FIGS. 4 and 5, it may be seen that protective device 30 is preferably rectangular in shape. Further, it may be seen that portal 50 can be formed by scoring a portion of mounting panel 32 in order to define a tear-away section thereof. Portal 50 is formed by a plurality of parallel first scorelines 52, as is shown in FIG. 7, and a plurality of parallel second scorelines 54 that extend transversely to first scorelines 52. Thus, portal 50 may be easily torn-away by flap 21 in order to create chamber 42 when a user's hand is inserted through the handhold opening. As is seen in FIG. 6, scorelines 52 preferably extend longitudinally the complete length of protective device 30 between side edges 56 and 58 thereof. Moreover, it may be seen in reference to FIG. 4 that deadening material 44 and portal 50 extend parallel to one another in closely spaced apart relation. Here also, deadening material 44 extends longitudinally of protective device 30 the complete distance between side edges 56 and 58.

Figure 8:
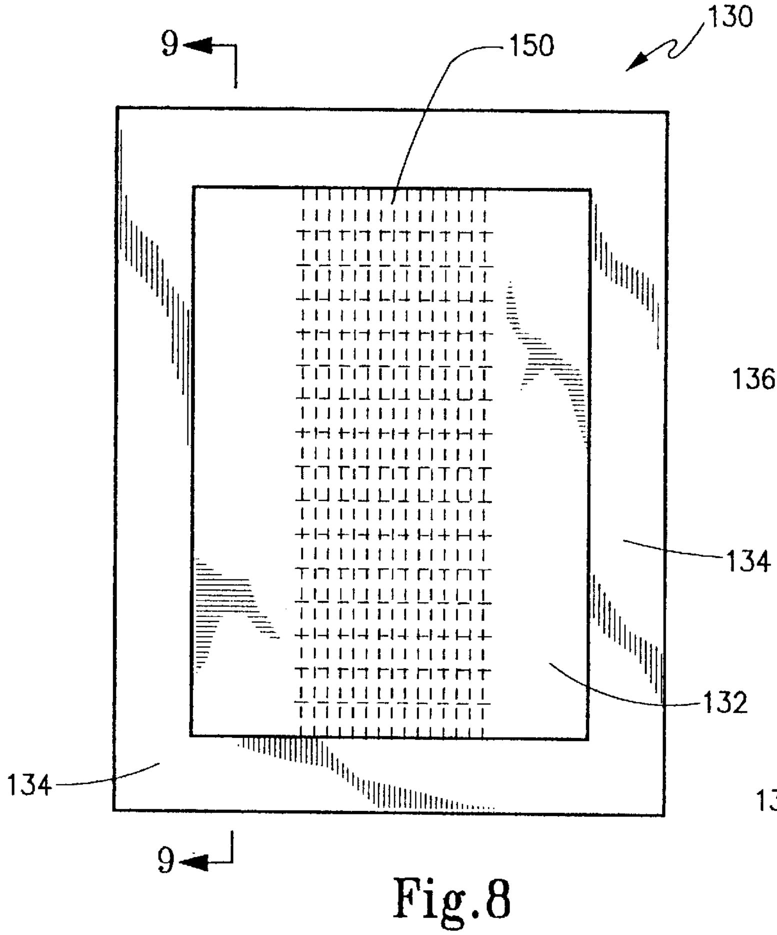
FIG. 8 is a front view in elevation of a second exemplary embodiment of the present invention.
Figure 9:
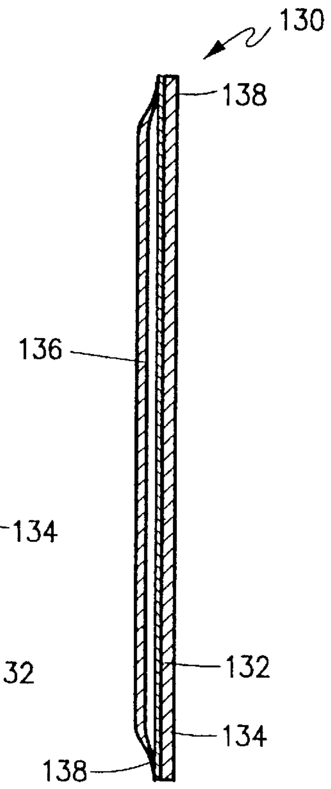
FIG. 9 is a cross-section view taken about lines 9—9 of FIG. 8.

A second exemplary embodiment of the protective device is shown in FIGS. 8 and 9. Here, the deadening material 44 is eliminated. Thus, protective device 130 shown in FIGS. 8 and 9 includes a mounting panel 132 provided with a portal 150 of the construction described above. An exclusion panel 136 is secured at outer peripheral margin 138 either by an adhesive or by some mechanical fusion with exclusion panel 136 being of congruent geometric construction with mounting panel 132. An adhesive material forms an adhesive band 134 that is mounted to a side surface of mounting panel 132 opposite exclusion panel 136 with band 134 extending completely around the peripheral margin of mounting panel 132 thus to surround the majority portion of portal 150. Here again, a peel-away protective strip may be provided to protect adhesive band 134, if desired.

Figure 10:
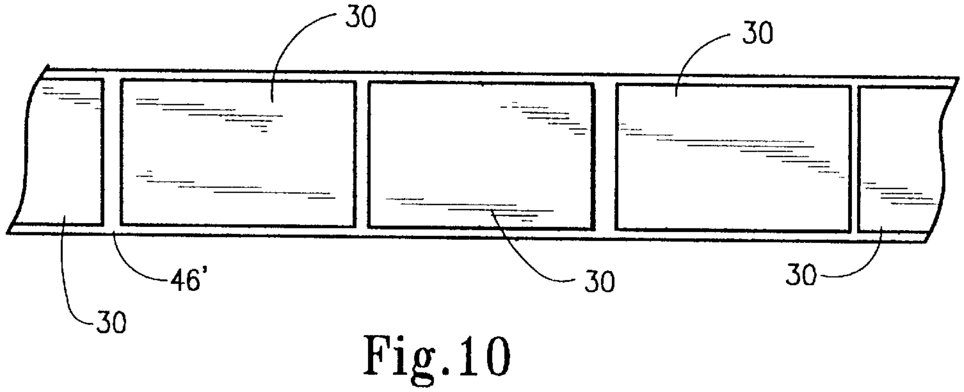
FIG. 10 is a top plan view showing a plurality of the protective devices such as those shown in FIGS. 3 and 8 mounted on an elongated backing strip.

In any event, a plurality of the protective devices, such as protective device 30 or protective device 130 may be secured to a single backing panel for use of manufacture, storage and use. Thus, for example, as is shown in FIG. 10, a plurality of protective devices 30 are secured to an elongated strip 46' that defines a common backing panel for each of protective devices 30. This allows sequential protective devices 30 to be fed off of strip 46' when applied to a container 10 in an automatic manufacturing process.

The present invention specifically contemplates a method of manufacture of the protective devices, such as protective device 30 or protective device 130. In its broad form, this method comprises a first step of advancing a first strip of material in a longitudinal direction from an upstream location to a downstream location. Next, the strip of material is scored in a longitudinal direction after which a second strip of material is secured to the first strip of material such as the second strip is sealed around a discrete consecutive portions of the scoring. Next, an adhesive material is applied to a side surface of the first strip opposite the second strip after which the joined first and second strips are cut into individual units with portions of the first and second strips in each unit being sealed completely around the periphery of the unit.

This method may also include the step of applying a deadening material to the adhesive material, for example, in a region that is parallel to the scoring of the first strip of material. This deadening material may include the securing of the third strip of material to the adhesive material on a side surface opposite the second strip. Moreover, the step of scoring the first strip is accomplished by continuously scoring the first strip as it is advanced in the downstream direction with this scoring being in a plurality of parallel spaced apart longitudinally extending scorelines.

Figure 11:
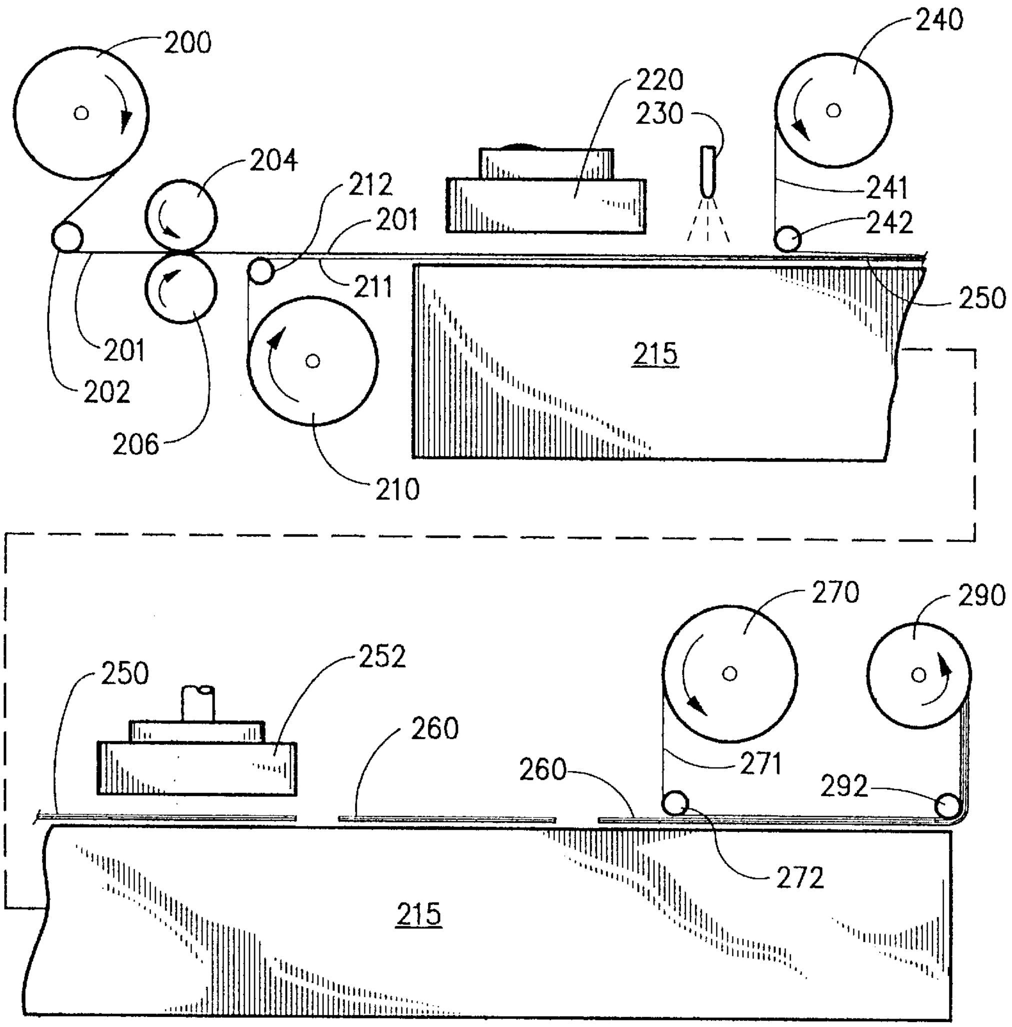
FIG. 11 is a diagrammatic view showing a fabrication process for producing the protective devices according to the present invention.

A representative diagram of a possible manufacturing process is shown in FIG. 11. Here, a spool 200 of the first strip material is located at an upstream location and is fed past reversing roller 202 so that it may be threaded between a pair of scoring rollers 204, 206 that operate to longitudinally score strip 201 as it is longitudinally advanced in the downstream direction. A roll 210 of a second strip material is fed by roller 212 as a strip 211 that confronts strip 201 as the pair of strips move in a downstream direction and onto a support table 215. A fusing apparatus, such as an ultrasonic welder, ultraviolet adhesive activator or such other sealer 220 as is known in the art then seals strips 201 and 211 together in a ladder-like pattern along opposite lateral edges and along transverse central areas. Adhesive may then be applied by applicator 230, which may be spray applicator or roller applicator or other applicator as is known in the art. Here, the adhesive is applied to strip 201 at a side opposite strip 211. Next, a deadening material such as a paper strip 241 is fed off of roller 240 and around roller 242 so that strip 241 becomes secured to strip 201. This creates a fused and joined strip 250 which may then be fed through a cutting mechanism 252 which cuts strip 250 into discrete units 260 that has an exposed adhesive material. Units 260 are then adhered to a backing strip 271 which is fed off of a roll of material 270 around roller 272 to create a finished strip of units, such as is shown in FIG. 10. This continuous strip may be rewound onto spool 290 over a roller 292 to complete the process.

Accordingly, the present invention has been described with some degree of particularity directed to the exemplary embodiments of the present invention. It should be appreciated, though, that the present invention is defined by the following claims construed in light of the prior art so that modifications or changes may be made to the exemplary embodiments of the present invention without departing from the inventive concepts contained herein.

We claim:

1. A method of producing a protective device that is adapted to be used with a container in order to inhibit ingress of unwanted materials through a handhold opening in a wall of said container, comprising the steps of:

(a) advancing a first strip of material in a longitudinal direction from an upstream location to a downstream location;

(b) longitudinally scoring said strip of material;

(c) securing a second strip of material to said first strip of material such that said second strip is sealed around discrete consecutive portions of scoring;

(d) applying an adhesive material to a side surface of said first strip opposite said second strip; and (e) cutting said first and second strips into individual units with portions of said first and second strips in each said unit being sealed completely around a periphery of said unit.

2. The method according to claim 1 wherein the step of scoring said first strip is accomplished by continuously scoring said first strip as it is advanced in the downstream direction.

3. The method according to claim 2 wherein the step of scoring said first strip is accomplished by scoring said first strip with a plurality of parallel, spaced-apart longitudinally extending score lines.

4. The method according to claim 1 wherein the step of securing said second strip to said first strip is accomplished by fusing said first and second strips together.

5. The method according to claim 1 including the step of applying a deadening material to the adhesive material on said side surface of said first strip.

* * * * *